United States Patent
Smee et al.

(10) Patent No.: US 8,855,094 B2
(45) Date of Patent: Oct. 7, 2014

(54) METHODS AND APPARATUS FOR REDUCING INTERFERENCE IN WIRELESS COMMUNICATION SYSTEMS

(75) Inventors: John Edward Smee, San Diego, CA (US); Joseph B. Soriaga, San Diego, CA (US); Navid Hassanpour Ghady, San Diego, CA (US); Jilei Hou, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1040 days.

(21) Appl. No.: 12/030,834

(22) Filed: Feb. 13, 2008

(65) Prior Publication Data

US 2009/0201839 A1 Aug. 13, 2009

(51) Int. Cl.
*H04B 7/216* (2006.01)
*H04W 72/12* (2009.01)
*H04W 72/04* (2009.01)
*H04L 1/00* (2006.01)
*H04W 28/04* (2009.01)

(52) U.S. Cl.
CPC ........ *H04W 72/1231* (2013.01); *H04W 72/046* (2013.01); *H04L 1/0002* (2013.01); *H04W 28/04* (2013.01)
USPC ........................................................ 370/342

(58) Field of Classification Search
USPC ................................................ 370/334, 342
See application file for complete search history.

(56) References Cited

U.S. PATENT DOCUMENTS

| | | | |
|---|---|---|---|
| 6,262,980 B1 | 7/2001 | Leung et al. | |
| 7,257,406 B2 | 8/2007 | Ji | |
| 2004/0063468 A1* | 4/2004 | Frank | 455/561 |
| 2004/0162093 A1 | 8/2004 | Bevan et al. | |
| 2004/0235527 A1* | 11/2004 | Reudink et al. | 455/561 |
| 2005/0271012 A1* | 12/2005 | Agrawal et al. | 370/331 |
| 2006/0217158 A1 | 9/2006 | Uwano et al. | |
| 2007/0293260 A1 | 12/2007 | Xiao et al. | |
| 2008/0253297 A1* | 10/2008 | Hulbert | 370/252 |
| 2009/0196203 A1 | 8/2009 | Taira et al. | |
| 2009/0219865 A1* | 9/2009 | Salzer et al. | 370/329 |
| 2010/0103900 A1* | 4/2010 | Yeh et al. | 370/330 |
| 2010/0182967 A1* | 7/2010 | Zorba Barah et al. | 370/329 |
| 2012/0057542 A1* | 3/2012 | Li et al. | 370/329 |

FOREIGN PATENT DOCUMENTS

| | | |
|---|---|---|
| CN | 1317916 A | 10/2001 |
| CN | 101095297 A | 12/2007 |
| EP | 1876847 A1 | 1/2008 |

(Continued)

OTHER PUBLICATIONS

International Search Report/Written Opinion—PCT/US09/033573—International Search Authority EPO—May 19, 2009.

(Continued)

*Primary Examiner* — Brandon Renner
*Assistant Examiner* — Faisal Choudhury
(74) *Attorney, Agent, or Firm* — Kenyon S. Jenckes; Thomas A. Jolly

(57) ABSTRACT

In accordance with a method for reducing interference in a wireless communication system, information about at least one disallowed beam corresponding to at least one served user may be determined. Scheduling decisions for served users may be made so as to avoid transmissions via the at least one disallowed beam. Data may be transmitted to users in accordance with the scheduling decisions.

28 Claims, 13 Drawing Sheets

(56) References Cited

FOREIGN PATENT DOCUMENTS

| | | |
|---|---|---|
| JP | 2006270216 A | 10/2006 |
| JP | 2006333482 A | 12/2006 |
| WO | 2004073267 A1 | 8/2004 |
| WO | WO2008004609 | 1/2008 |

OTHER PUBLICATIONS

Taiwan Search Report—TW098104539—TIPO—Apr. 19, 2012.

* cited by examiner

METHODS AND APPARATUS FOR REDUCING INTERFERENCE IN WIRELESS COMMUNICATION SYSTEMS

TECHNICAL FIELD

The present disclosure relates generally to wireless communication systems. More specifically, the present disclosure relates to methods and apparatus for reducing interference in wireless communication systems.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

DETAILED DESCRIPTION

Figure 1A:
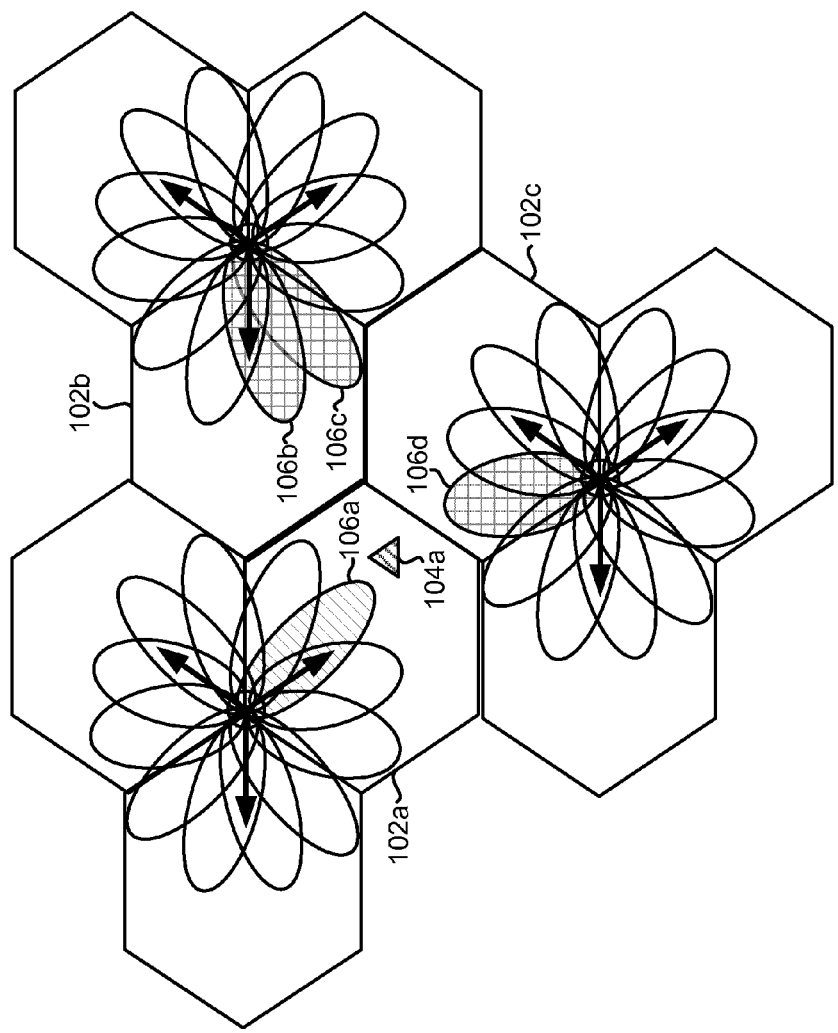
FIGS. 1A through 1D illustrate an example showing how served users may be scheduled so as to avoid the use of disallowed beams.

A method for reducing interference in a wireless communication system is disclosed. In accordance with the method, information about at least one disallowed beam corresponding to at least one served user may be determined. Scheduling decisions for served users may be made so as to avoid transmissions via the at least one disallowed beam. Data may be transmitted to users in accordance with the scheduling decisions.

An apparatus for reducing interference in a wireless communication system is also disclosed. The apparatus includes a processor and memory in electronic communication with the processor. Instructions may be stored in the memory. The instructions may be executable to determine information about at least one disallowed beam corresponding to at least one served user. The instructions may also be executable to make scheduling decisions for served users so as to avoid transmissions via the at least one disallowed beam. The instructions may also be executable to transmit data to users in accordance with the scheduling decisions.

An apparatus for reducing interference in a wireless communication system is also disclosed. The apparatus may include means for determining information about at least one disallowed beam corresponding to at least one served user. The apparatus may also include means for making scheduling decisions for served users so as to avoid transmissions via the at least one disallowed beam. The apparatus may also include means for transmitting data to users in accordance with the scheduling decisions.

A computer-program product for reducing interference in a wireless communication system is also disclosed. The computer-program product includes a computer-readable medium having instructions thereon. The instructions may include code for determining information about at least one disallowed beam corresponding to at least one served user. The instructions may also include code for making scheduling decisions for served users so as to avoid transmissions via the at least one disallowed beam. The instructions may also include code for transmitting data to users in accordance with the scheduling decisions.

A wireless communication system may provide communication for a number of cells, each of which may be serviced by a base station. A base station may be a fixed station that communicates with access terminals. A base station may alternatively be referred to as an access point, a Node B, or some other terminology.

Access terminals may be fixed (i.e., stationary) or mobile. Access terminals may alternatively be referred to as user terminals, terminals, subscriber units, remote stations, mobile stations, stations, etc. Access terminals may be wireless devices, cellular phones, personal digital assistants (PDAs), handheld devices, wireless modems, laptop computers, personal computers, etc. A variety of algorithms and methods may be used for transmissions in a wireless communication system between the base stations and the access terminals.

A communication link that facilitates transmission from a base station to an access terminal may be referred to as a forward link, and a communication link that facilitates transmission from an access terminal to a base station may be referred to as a reverse link. Alternatively, a forward link may be referred to as a downlink or a forward channel, and a reverse link may be referred to as an uplink or a reverse channel.

A cell may be divided into multiple sectors. A sector is a physical coverage area within a cell. Base stations within a wireless communication system may utilize antennas that concentrate the flow of power within a particular sector of the cell. Such antennas may be referred to as directional antennas.

A system where one transmitter is used to transmit data to one receiver may be referred to as a SISO (single-input and single-output) system, whereas a system where more than one transmitter is used and more than one receiver is used may be referred to as a MIMO (multiple-input and multiple-output) system. MIMO systems may have certain advantages over SISO systems, such as increased data rate and increased receiver sensitivity.

OFDM (orthogonal frequency division multiplexing) is a digital multi-carrier modulation technique that has recently found wide adoption in a variety of high-data-rate communication systems. With OFDM, a transmit bit stream may be divided into multiple lower-rate sub-streams. Each sub-stream may be modulated with one of multiple orthogonal sub-carriers and sent over one of a plurality of parallel sub-channels. OFDMA (orthogonal frequency division multiple access) is a multiple access technique in which users are assigned sub-carriers in different time slots.

Forward link scheduling in a wireless communication system (e.g., a cellular network) may be accomplished by having each user feed back its desired serving sector and an associated data rate, or channel quality, to the base station. This allows users moving throughout a geographic region to hand-off between sectors to generally be served by the closest transmitter, based on selecting the serving sector according to the signal-to-noise-plus-interference ratio (SINR). In MIMO systems with multiple transmit and multiple receive antennas, the users may also feed back to their serving sector a desired number of streams (the so-called rank of the channel) as well as a target combined data rate, or feed back a desired data rate per stream. In systems with multiple potential spatial beams per sector (sometimes referred to as MIMO preceding) users may also feed back to their serving sector the index of the desired beam upon which they want to be served. These techniques correspond to feeding back side information to the serving sector as a means to achieve better link efficiency from the serving sector to the user.

In accordance with the present disclosure, information about disallowed beams may be determined and used for purposes of scheduling served users within a wireless communication system. A "disallowed beam" corresponding to a particular user refers to a beam that is expected to cause significant interference to the user. In the present disclosure, the term "beam" is used generally and may correspond to any effective antenna pattern created by any combination of antenna patterns, element patterns, and complex antenna array weight vectors.

Users may determine information about disallowed beam(s) and feed this information back to the appropriate sector(s), which may then use the information to make scheduling decisions. For example, if a user determines that a beam corresponding to a particular sector (which may be a neighboring sector or the user's serving sector) is a disallowed beam, then the user may provide information about the disallowed beam to the sector. The sector may then attempt to schedule served users in such a way that transmissions do not occur via the disallowed beam.

In addition to (or possibly instead of) the users themselves determining information about disallowed beam(s), base stations may determine information about disallowed beam(s) corresponding to served users. This may be done in time division duplex (TDD) systems, for example.

With appropriate design and constrained scheduling, the disallowed beams for a given user may be avoided in a particular time slot and/or set of OFDM tones while the user is served on preferred beam(s) from the serving sector to achieve various combinations of SIMO, MIMO and spatial division multiple access, or SDMA (i.e., where more than one user is served simultaneously on the same time slot and tones but on different transmit beams). This decreased interference may translate to improved forward link performance in terms of coverage and/or data rate.

FIGS. 1A through 1D illustrate an example showing how interference can be mitigated from the transmissions of other sectors in accordance with the present disclosure. Referring initially to FIG. 1A, it may be desirable for a first user 104a to be served via a desired beam 106a from its serving sector 102a. To minimize interference, it may also be desirable for neighboring sectors 102b, 102c to avoid transmission on certain disallowed beams 106b, 106c, 106d.

Figure 1B:
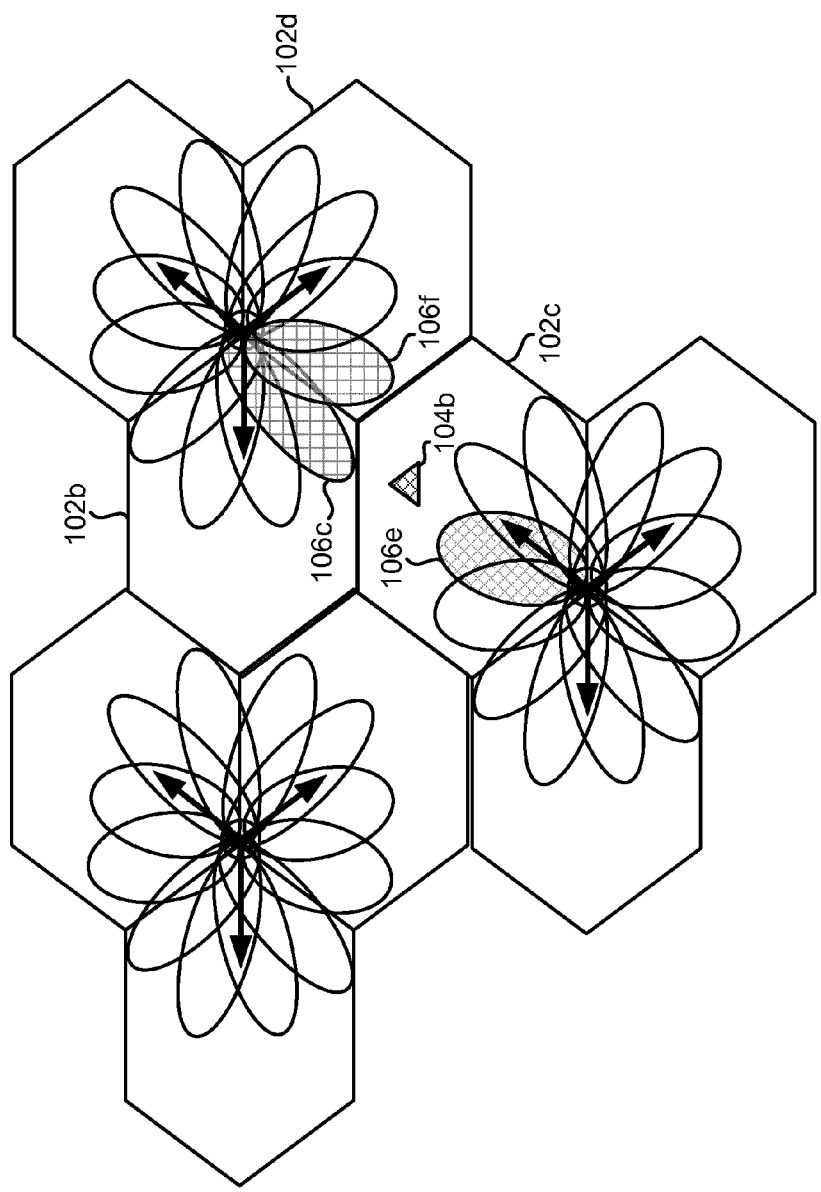

Referring now to FIG. 1B, it may be desirable for a second user 104b to be served via a desired beam 106e from its serving sector 102c. To minimize interference, it may also be desirable for neighboring sectors 102b, 102d to avoid transmission on certain disallowed beams 106c, 106f.

Figure 1C:
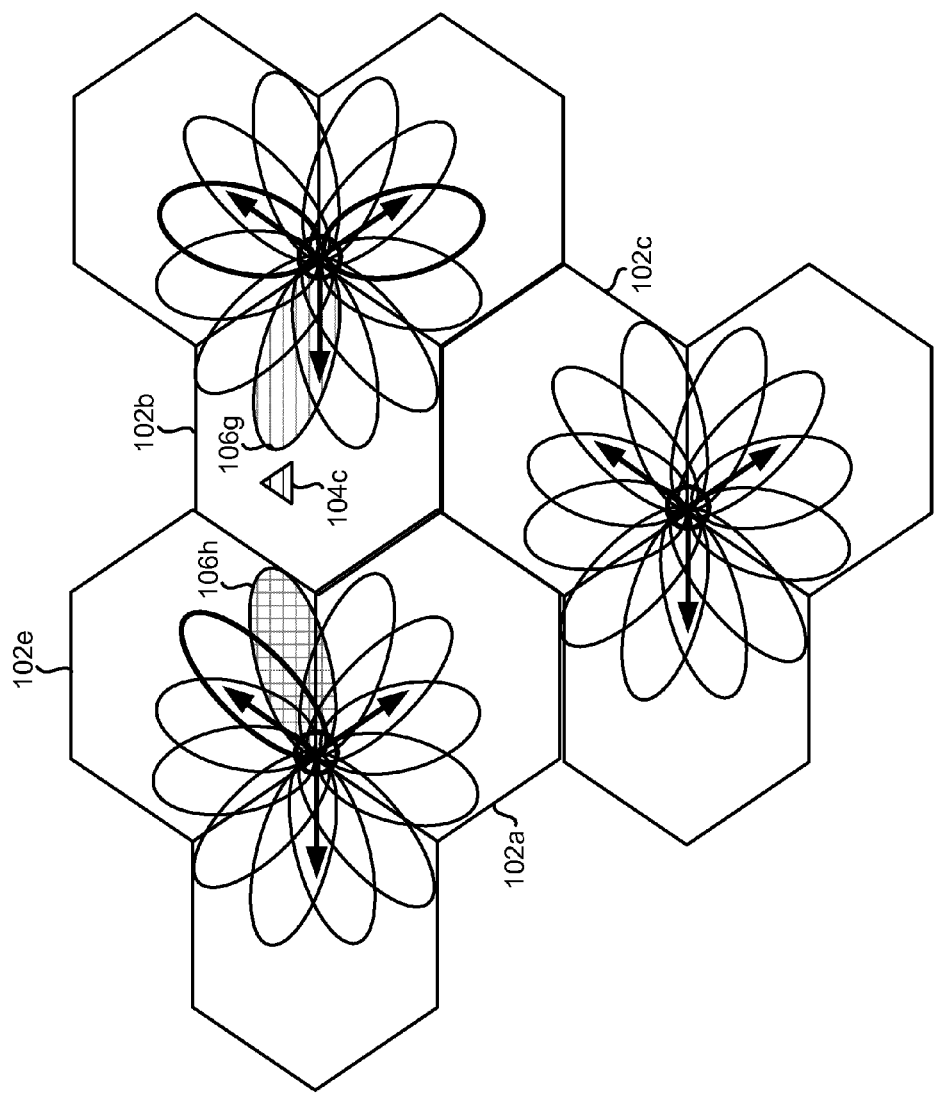

Referring now to FIG. 1C, it may be desirable for a third user 104c to be served via a desired beam 106g from its serving sector. To minimize interference, it may also be desirable for a neighboring sector 102e to avoid transmission on a disallowed beam 106h.

Figure 1D:
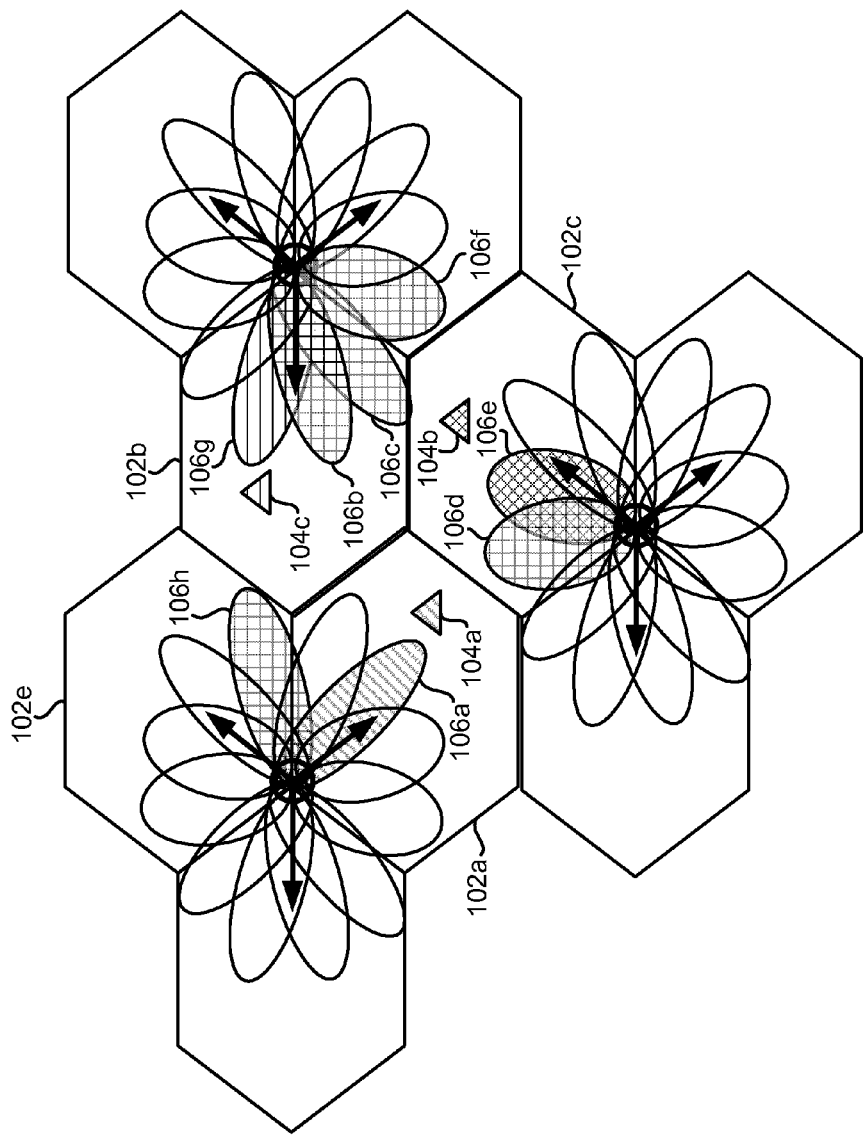

FIG. 1D illustrates how the three users 104a, 104b, 104c may be simultaneously served via the respective desired beams 106a, 106e, 106g from the respective serving sectors 102a, 102c, 102b, while avoiding the respective disallowed beams 106b, 106c, 106d, 106f, 106h from the respective neighbor sectors 102b, 102c, 102e.

In the example of FIGS. 1A through 1D, each sector 102 may be selected as the serving sector 102 by only one user 104 and each sector 102 may be able to serve on that beam 106 and avoid the disallowed beams 106 without explicit coordination with other sectors 102 or cells.

However, when there are large numbers of users per sector and a particular beam from a sector is selected as the desired serving beam for a particular user while that beam is selected as being disallowed for another user in an adjacent sector, then the sectors may coordinate with one another to accommodate both users (such as serving the two users on different time slots or tones so that the beam can be used to serve the desired user). This inter-sector coordinated scheduling could occur in a centralized location that receives the feedback to make scheduling decisions spanning multiple sectors or cells. In addition (or instead), there could be communication between cells or sectors to relay pertinent information or scheduling decisions, such as a broadcast to local neighbors of a scheduled beam that the sector is going to serve a user on.

Although a user may feed back a serving beam and disallowed beams to the network, the network may not honor the user's requests and those beams may end up getting used while the user is being served. For example, quality-of-service (QoS) considerations for delay sensitive applications may cause the network to not obey a user's request to have a neighboring beam not be used while the user is being served. In addition, a user may be served on a different beam than the selected serving beam if one or more other users have indicated that that particular serving beam was expected to cause high interference. The result may be that a given sector may obey some, none, or all of the requests from the users in its sector and neighboring sector(s). As such, the amount of coordinated scheduling and algorithm complexity can be decreased by relaxing the constraints either on an as needed basis for QoS reasons or due to implementation complexity considerations.

For simplicity, the scheduling has been described to avoid interference based on beam selection that occurs on a particular time slot and/or OFDM tone. In general, the scheduling performed by each sector, coordinated across sectors, or performed globally at a centralized location may also be concerned with the scheduling of users across tones and/or time slots.

In general, the spatial beams may correspond to either azimuth directions as depicted in FIGS. 1A through 1D, or more generally to any spatial beam formed by various combinations of transmit antennas and weights. Such combinations may be achieved based on complex baseband weights being applied to the transmit antennas. For example, a user could feed back M bits to denote one of $2^M$ different beams. The value $2^M$ could be specified upfront based on a particular choice of $2^M$ different weight vectors. The beams may be thought of as columns of a matrix.

The beam selection fed back from a user to the network of one or more base stations may be in the form of the beam index, which may be referred to as partial channel state information at the transmitter (partial CSIT). Of course, other methods of communicating the selection of the serving and disallowed beams are also possible in addition to those specifically described herein.

The feeding back of all information may not be required in certain systems, such as those where the network can make measurements on the reverse link that are applicable to the forward link. In a frequency division duplex (FDD) network, the base station receivers might only be able to use the reverse link to achieve a coarse measurement to estimate the forward link beam strength at each user (e.g., based on path loss, shadowing, and/or beam pattern knowledge) but may not necessarily be able to cover the effects of fading due to the frequency separation between the forward link and the reverse link. In time division duplex (TDD) applications, however, some base stations could also make measurements that would accurately estimate the forward link beam strengths at various users. In TDD systems, the full channel state knowledge of complex frequency response can be estimated at the transmitter (so-called full CSIT) with varying levels of accuracy depending on calibration, signal-to-noise ratio (SNR), Doppler, etc. Therefore, to implement the techniques described herein, not all of the information needs to be explicitly fed back from the users to the network.

Regardless of how the information becomes known to the scheduler (e.g., based on feedback or measurements), the scheduling described herein may seek to achieve a compromise of using the beams that are best for the served users but avoiding those beams that cause high interference to other simultaneously (in time/frequency) served users. For example, users could continue to feed back only their desired beam(s) for their desired serving sector and the base stations could perform their scheduling of users onto beams and/or tones and/or time slots based on the combination of the user feedback of the desired beam and the reverse link-derived estimates of how much interference that would create to other scheduled users. Alternatively, in TDD systems, reverse link measurements could also be used to estimate and select the transmit serving beam(s) to use from the serving sector, while the interference avoidance may be made known to the schedulers by users feeding back information for the interfering beams to be avoided by the sectors. For example, with full CSIT, the sector could transmit to a user along the eigenmodes of the user's channel, or it could choose from a fixed set of beams those that are closest to (have the largest inner product with) the eigenmodes, provided those beams do not cause high interference to others. Within the context of interference avoidance based on knowledge of disallowed beams, various other forward link linear transmit techniques are possible such as transmitting on a subspace orthogonal to the disallowed beams.

In general, there may not be any restriction on the number of selected desired beams and a user with multiple receiver antennas may communicate to the serving base station feedback to be served on multiple beams simultaneously (to achieve the degree of freedom gain from spatial multiplexing MIMO transmission which may be useful at a high signal-to-noise ratio). For example, users may select one or more beams upon which to be served from the serving sector and feed back one or more disallowed beams that the user does not want neighboring sectors to use.

Figure 2:
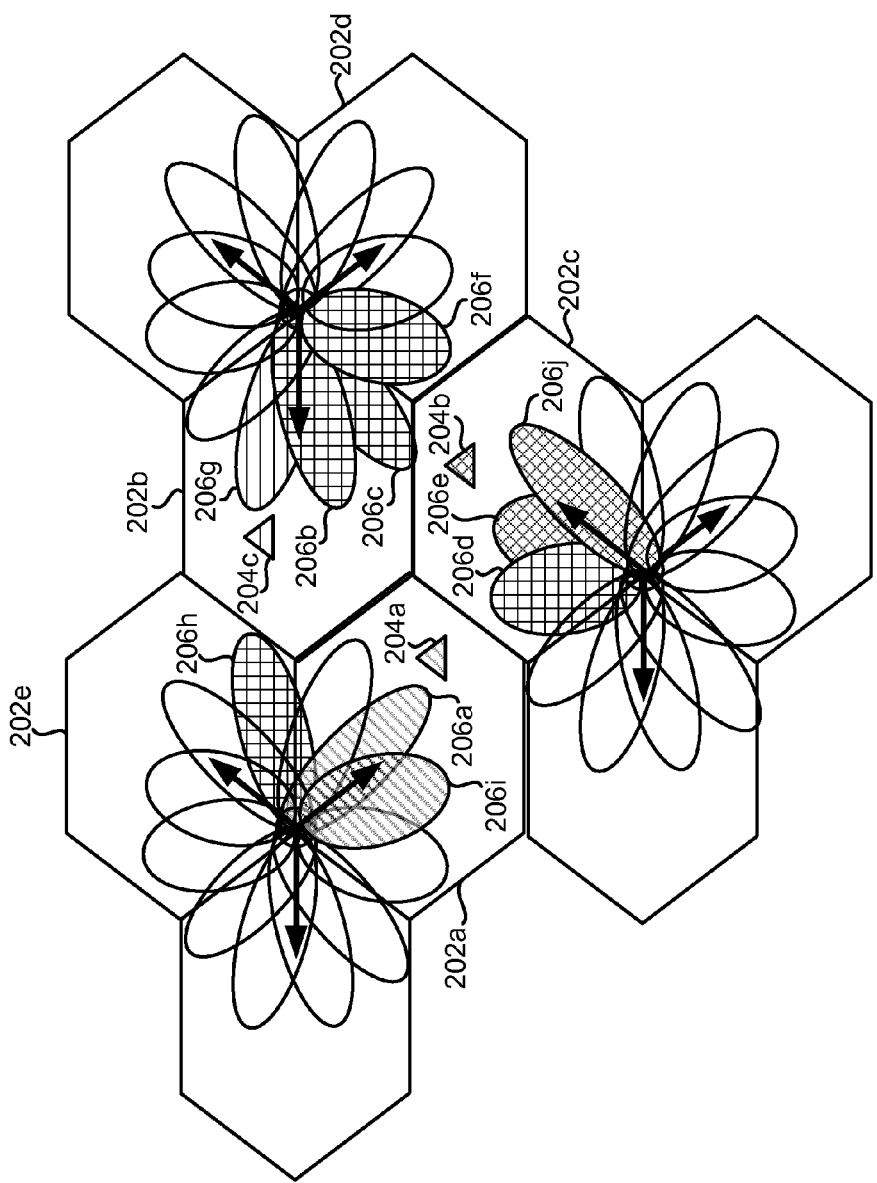
FIG. 2 illustrates another example showing how served users may be scheduled so as to avoid the use of disallowed beams.

An example is shown in FIG. 2. As shown, a first user 204a may be served multiple streams of data simultaneously via the desired beams 206a, 206i from its serving sector 202a. To minimize interference with the first user 204a, neighbor sectors 202b, 202c may avoid transmission on disallowed beams 206b, 206c, 206d corresponding to the first user 204a. Similarly, a second user 204b may be served multiple streams of data simultaneously via the desired beams 206e, 206j from its serving sector 202c, and neighbor sectors 202b, 202d may avoid transmission on disallowed beams 206c, 206f corresponding to the second user 204b. A third user 204c may be served a single stream of data from the desired beam 206g of its serving sector 202b, and a neighbor sector 202e may avoid transmission on a disallowed beam 206h corresponding to the third user 204c.

There are many different possible MIMO implementations. In accordance with the present disclosure, any of the various MIMO techniques may be combined with the additional constraint of scheduling to avoid disallowed beams.

Another potential application is simultaneously serving multiple users from a particular sector. As indicated above, when more than one user is served simultaneously on the same time slot and tones but on different transmit beams, the technique may be referred to as spatial division multiple access (SDMA). In general, in the context of the present disclosure, there are no restrictions on the definition of a sector or a cell. Although the multiple users 204 being served in FIG. 2 were each served by a unique sector 202, users in the same sector may also be served simultaneously. This may be accomplished by having the users feed back not only their desired beam(s) from the serving sector and their undesired beams from other sectors, but also the undesired beams from their serving sector.

Figure 3A:
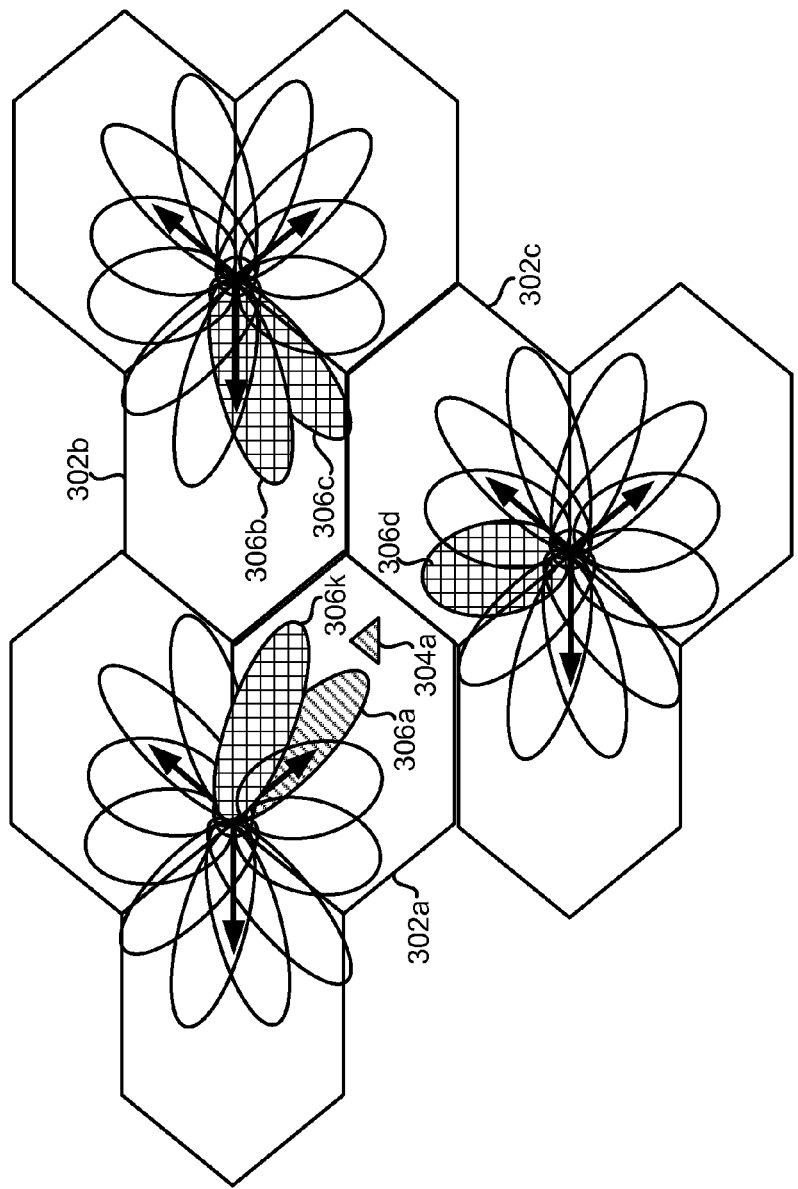
FIGS. 3A through 3C illustrate another example showing how served users may be scheduled so as to avoid the use of disallowed beams.
Figure 3B:
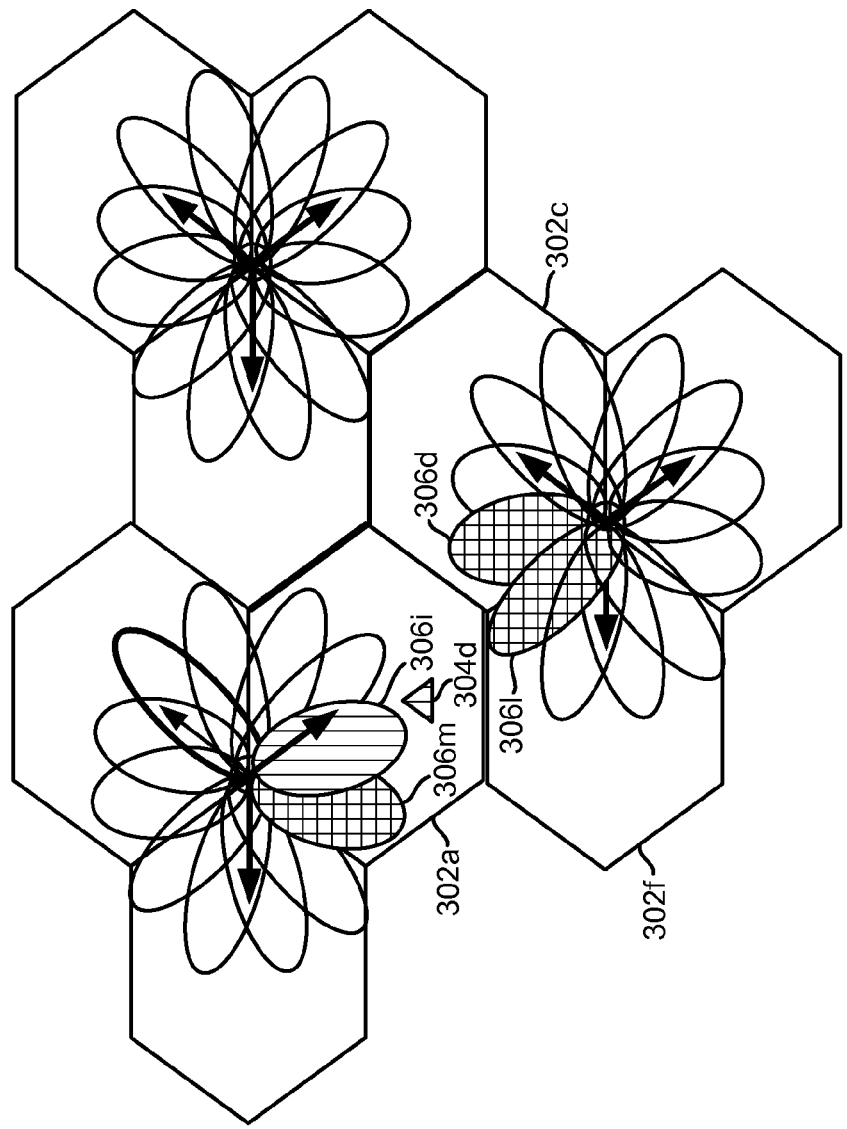
Figure 3C:
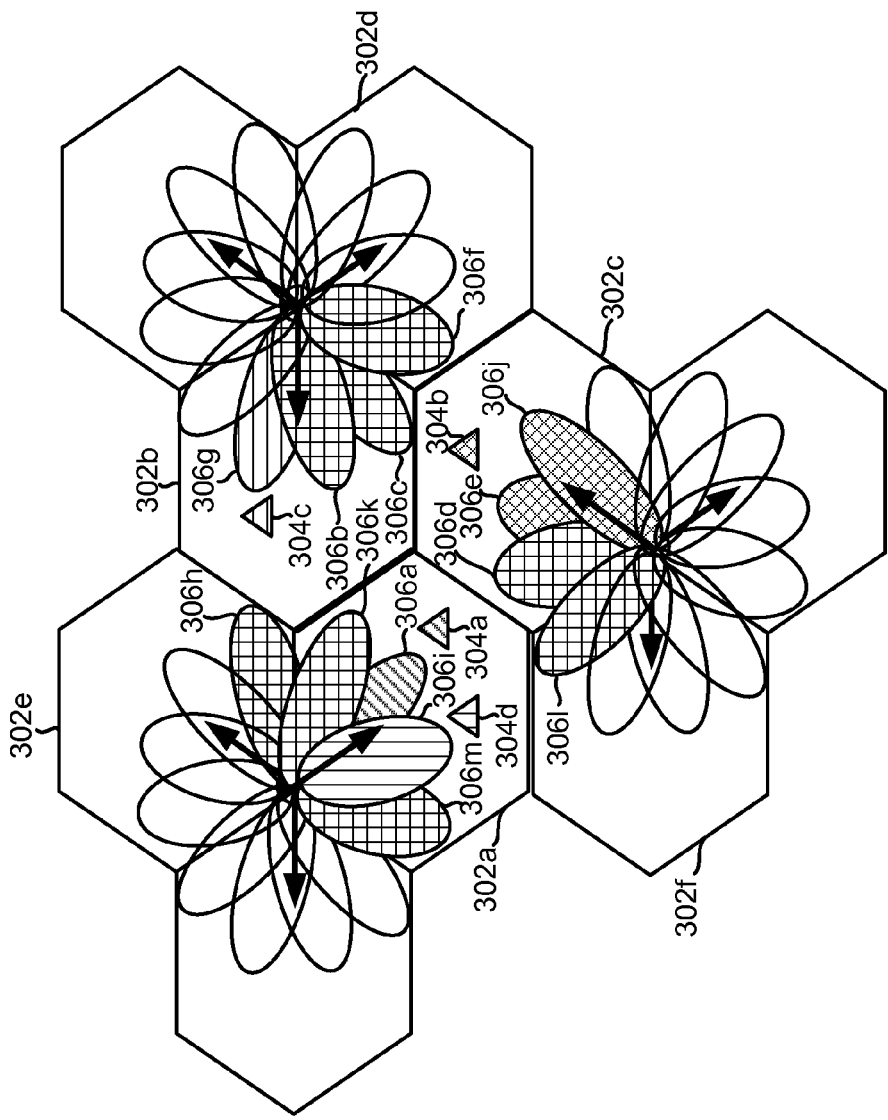

An example is shown in FIGS. 3A through 3C. Referring initially to FIG. 3A, it may be desirable for a first user 304a to be served via a desired beam 306a from its serving sector 302a. To minimize interference, it may also be desirable for neighbor sectors 302b, 302c to avoid transmission on disallowed beams 306b, 306c, 306d. In addition, it may be desirable for the serving sector 302a to also avoid transmission on a disallowed beam 306k.

Referring now to FIG. 3B, it may be desirable for a fourth user 304d to be served via a desired beam 306i from its serving sector 302a. To minimize interference, it may be desirable for neighbor sectors 302c, 302f to avoid transmission on disallowed beams 306d, 306l. In addition, it may be desirable for the serving sector 302a to also avoid transmission on a disallowed beam 306m.

FIG. 3C shows how the network may attempt to satisfy the constraints shown in FIG. 3A for the first user 304a and the constraints shown in FIG. 3B for the fourth user 304d, while also satisfying constraints for a second user 304b and a third user 304c. As shown, the first user 304a may be served via a desired beam 306a from its serving sector 302a. Neighbor sectors 302b, 302c may avoid transmission on disallowed beams 306b, 306c, 306d corresponding to the first user 304a. In addition, it may be desirable for the serving sector 302a to also avoid transmission on a disallowed beam 306k.

The second user 304b may be served multiple streams of data simultaneously via the desired beams 306e, 306j from its serving sector 302c. Neighbor sectors 302b, 302d may avoid transmission on disallowed beams 306c, 306f corresponding to the second user 304b.

The third user 304c may be served via a desired beam 306g from its serving sector 302b. A neighbor sector 302e may avoid transmission on a disallowed beam 306h corresponding to the third user 304c.

The fourth user 304d may be served via a desired beam 306i from its serving sector 302a. Neighbor sectors 302c, 302f may avoid transmission on disallowed beams 306d, 306l corresponding to the fourth user 304d. In addition, the serving sector 302a may avoid transmission on a disallowed beam 306m corresponding to the fourth user 304d.

The example of FIGS. 3A through 3C depicts one sector 302b serving a single user 304c (i.e., single stream transmission), one sector 302c serving two streams to one user 304b (i.e., spatial multiplexing MIMO) and one sector 302a serving two users 304a, 304d on different beams 306a, 306i (i.e., SDMA) in addition to the network attempting to avoid using the disallowed beams 306b, 306c, 306d, 306f, 306h, 306l, 306m corresponding to the various users 304a, 304b, 304c, 304d. Any combination of sector transmission techniques is possible.

Figure 4:
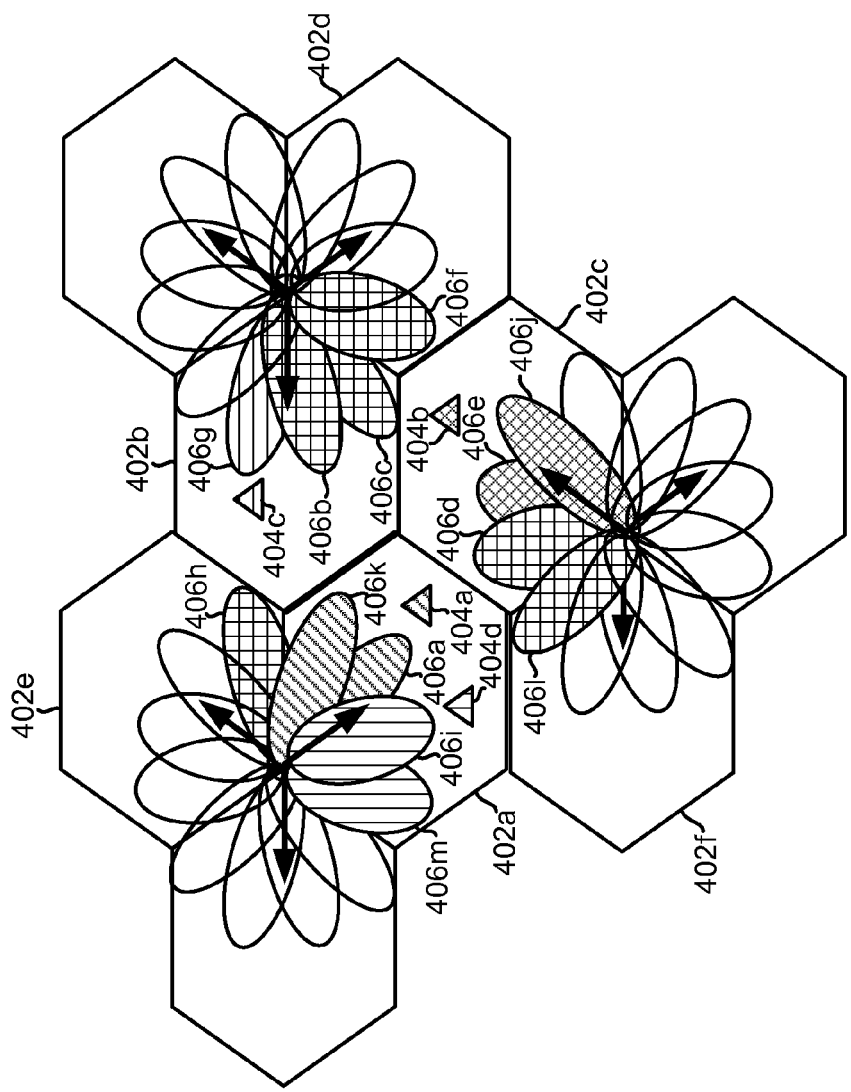
FIG. 4 illustrates another example showing how served users may be scheduled so as to avoid the use of disallowed beams.

The above concepts can be further generalized by considering multiple users in a given sector being served one or more streams at the same time (i.e., combined SDMA/MIMO). This is shown in the example of FIG. 4.

As shown, the first user 404a may be served multiple streams of data simultaneously via the desired beams 406a, 406k from its serving sector 402a. Neighbor sectors 402b, 402c may avoid transmission on disallowed beams 406b, 406c, 406d.

The second user 404b may be served multiple streams of data simultaneously via the desired beams 406e, 406j from its serving sector 402c. Neighbor sectors 402b, 402d may avoid transmission on disallowed beams 406c, 406f.

The third user 404c may be served via a desired beam 406g from its serving sector 402b. A neighbor sector 402e may avoid transmission on a disallowed beam 406h.

The fourth user 404d may be served multiple streams of data simultaneously via the desired beams 406i, 406m from its serving sector 402a. Neighbor sectors 402c, 402f may avoid transmission on disallowed beams 406d, 406l.

Thus, in the example of FIG. 4, the first user 404a and the fourth user 404d are each served more than one stream at the same time from the same sector 402. In addition, the network scheduling may be coordinated in an attempt to avoid using beams 406 that cause high interference.

Figure 5:
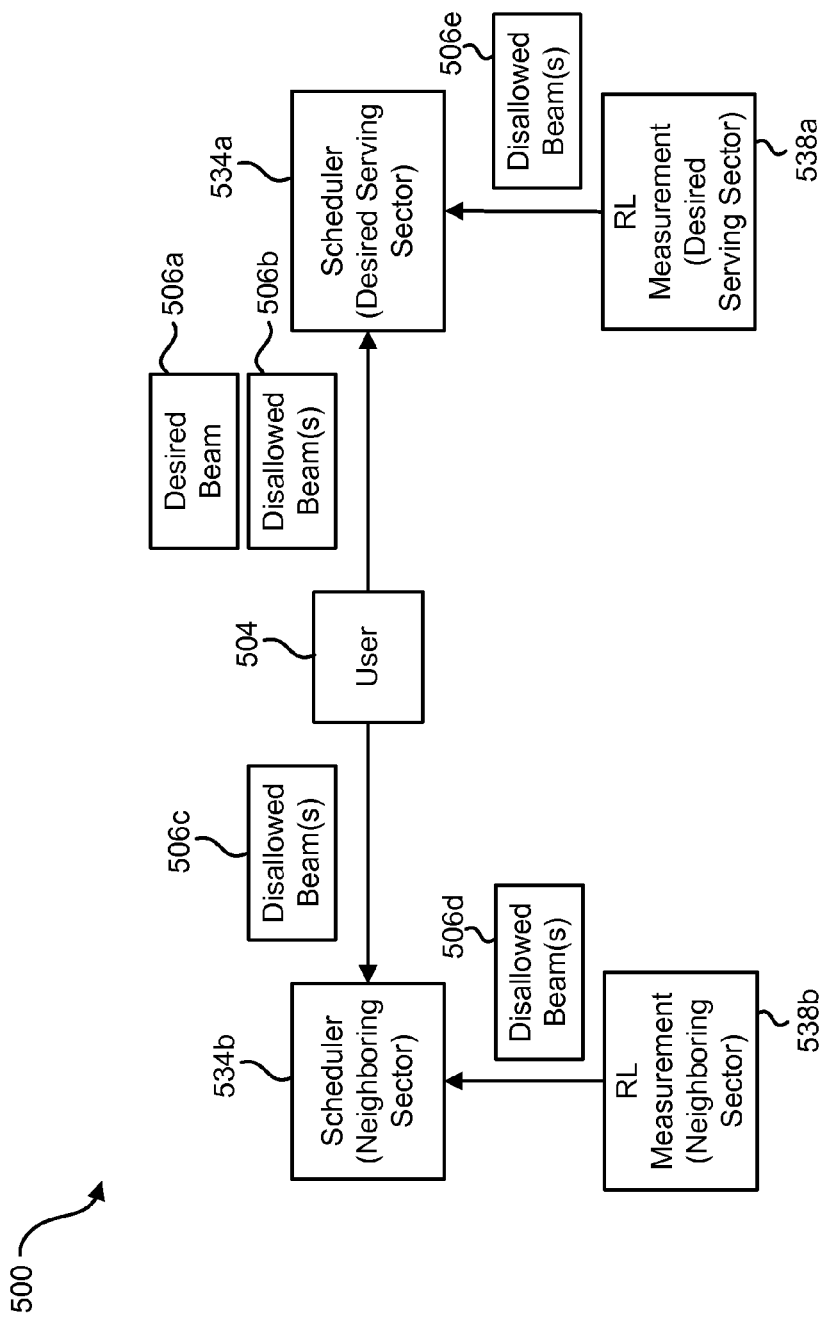
FIG. 5 illustrates a system for reducing interference in a wireless communication system.

FIG. 5 illustrates a system 500 for reducing interference in a wireless communication system. A user 504 may determine information such as its desired serving sector, and/or the desired serving beam 506a from the desired serving sector, and/or one or more disallowed beams 506b, 506c from neighbor sectors and/or the serving sector. This information may be determined by making various forward link measurements. As indicated above, the desired serving beam 506a and/or the disallowed beam(s) 506b, 506c may be determined with respect to a given time slot and/or OFDM tone.

The user 504 may notify a scheduler 534a for the desired serving sector about the desired serving beam 506a, and also about the disallowed beam(s) 506b from the desired serving sector. The user 504 may also notify a scheduler 534b for the neighboring sector about any disallowed beam(s) 506c from the neighboring sector.

In addition to the user 504 determining information about disallowed beam(s) 506b, 506c, the network may also determine information about disallowed beam(s) 506d, 506e corresponding to the user 504. This may be done by making reverse link measurements. Reverse link measurement components 538a, 538b are shown for providing this functionality. The scheduler 534b for the neighboring sector may be notified about any disallowed beam(s) 506d corresponding to the user 504 that are determined by making reverse link measurements. Similarly, the scheduler 534a for the desired serving sector may also be notified about any disallowed beam(s) 506e corresponding to the user 504 that are determined by making reverse link measurements.

The schedulers 534a, 534b may determine the scheduling of served users and beams so as to avoid using the disallowed beams 506b, 506c, 506d, 506e when possible. The schedulers 534a, 534b may implement any combination of SIMO, MIMO, and SDMA transmissions. As shown, communication between the schedulers 534a, 534b may occur in order to coordinate the scheduling of served users.

The schedulers 534a, 534b and the reverse link measurement components 538a, 538b may be implemented in various network entities, such as one or more base stations. For example, the schedulers 534a, 534b and the reverse link measurement components 538a, 538b may be implemented at different base stations. Alternatively, the schedulers 534a, 534b and the reverse link measurement components 538a, 538b may be implemented at the same base station. This may occur, for example, where the same base station serves both the desired serving sector and the neighboring sector. Also, although two schedulers 534a, 534b are shown in FIG. 5 (one for the desired serving sector, and one for a neighboring sector), one scheduler (e.g., a centralized scheduler) may handle the scheduling for multiple sectors.

Figure 6:
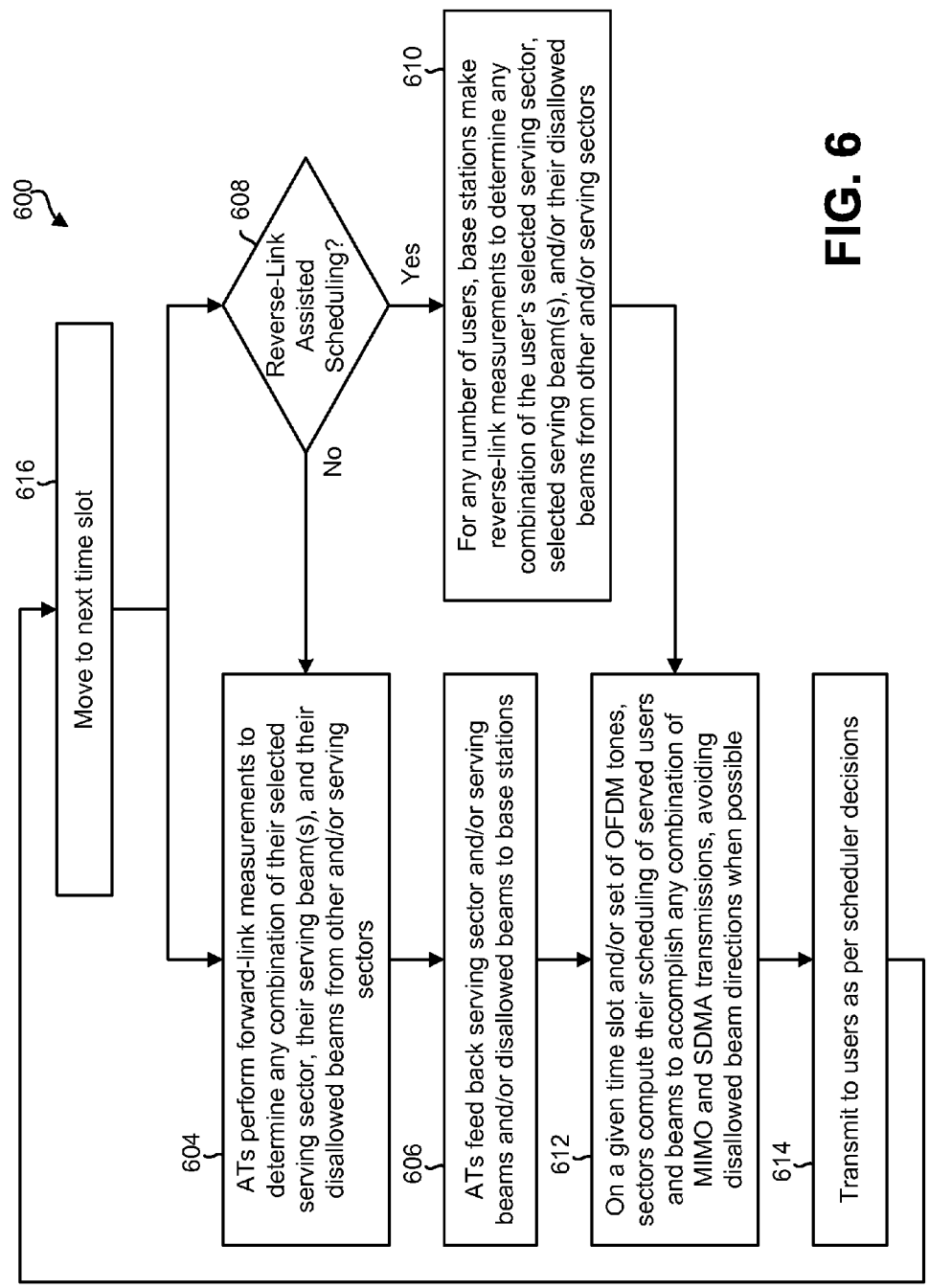
FIG. 6 illustrates a method for reducing interference in a wireless communication system.

FIG. 6 illustrates a method 600 for reducing interference in a wireless communication system. In accordance with the method 600, access terminals (users) may make 604 forward link measurements to determine information such as a desired serving sector, and/or a desired serving beam from the desired serving sector, and/or one or more disallowed beams from neighboring sectors and/or the serving sector. Access terminals (users) may feed back 606 this information to the appropriate network entities (e.g., scheduler(s) at the base station(s)).

If reverse-link activated scheduling has been activated 608, then reverse link measurements may be made 610 to determine information that is similar to the information described above. More specifically, for each user the following may be determined: the desired serving sector for the user, and/or the desired serving beam from the desired serving sector, and/or one or more disallowed beams from neighbor sectors and/or the serving sector. This information may be determined by base station(s) corresponding to the desired serving sector and/or neighboring sector(s).

One or more schedulers may determine 612 the scheduling of served users and beams to accomplish any combination of MIMO and SDMA transmissions. This may be done with respect to a given time slot and/or a given set of OFDM tones. Scheduler(s) may make scheduling decisions so as to avoid disallowed beam directions when possible. Data may then be transmitted 614 to users in accordance with the scheduling decisions that are made by the scheduler(s). Then, the method 600 may involve moving 616 to the next time slot and repeating the operations described above.

Figure 7:
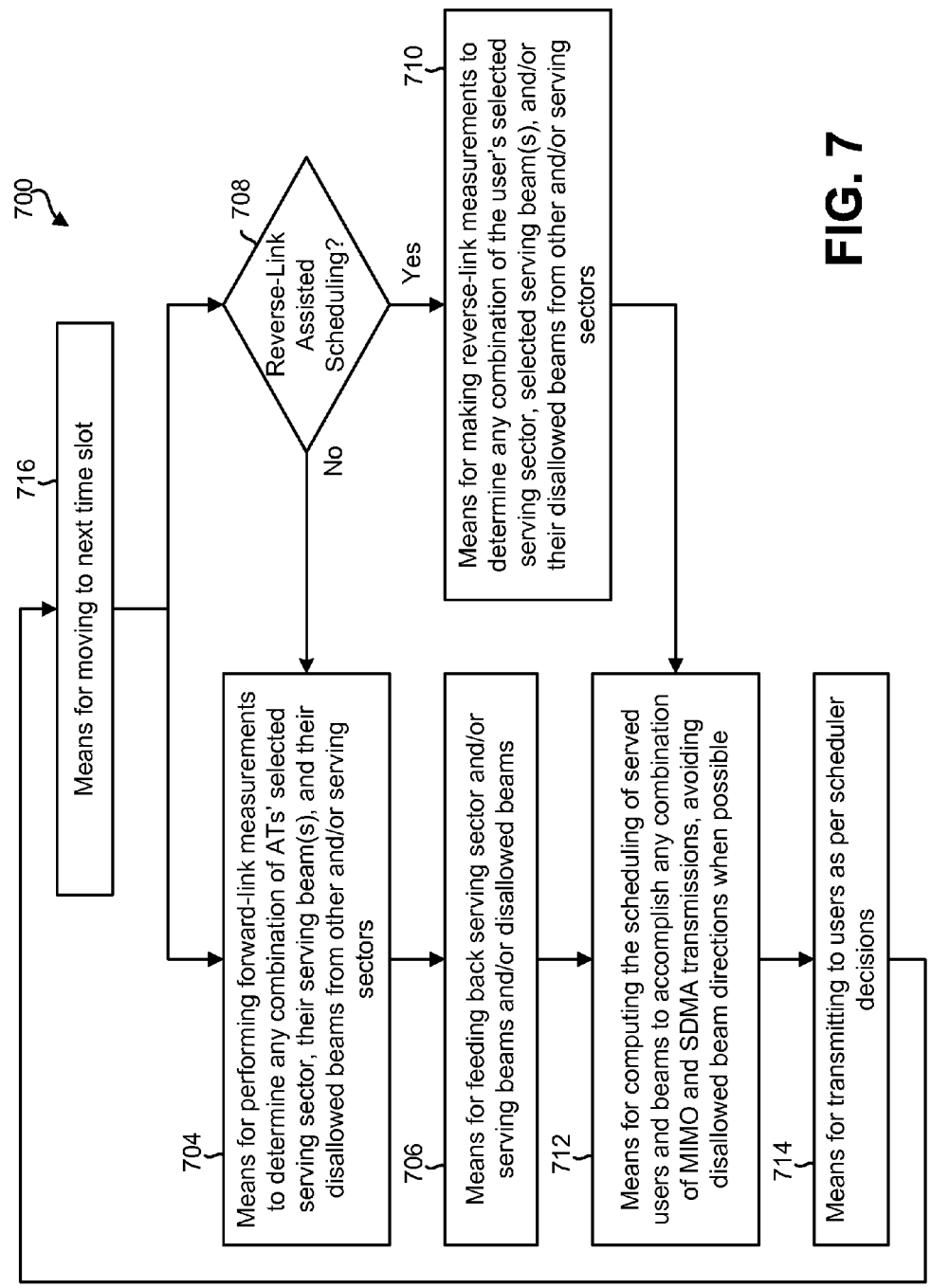
FIG. 7 illustrates means-plus-function blocks corresponding to the method shown in FIG. 6.

The method 600 of FIG. 6 may be performed by various hardware and/or software component(s) and/or module(s) corresponding to the means-plus-function blocks 700 illustrated in FIG. 7. In other words, blocks 604 through 616 illustrated in FIG. 6 correspond to means-plus-function blocks 704 through 716 illustrated in FIG. 7.

Figure 8:
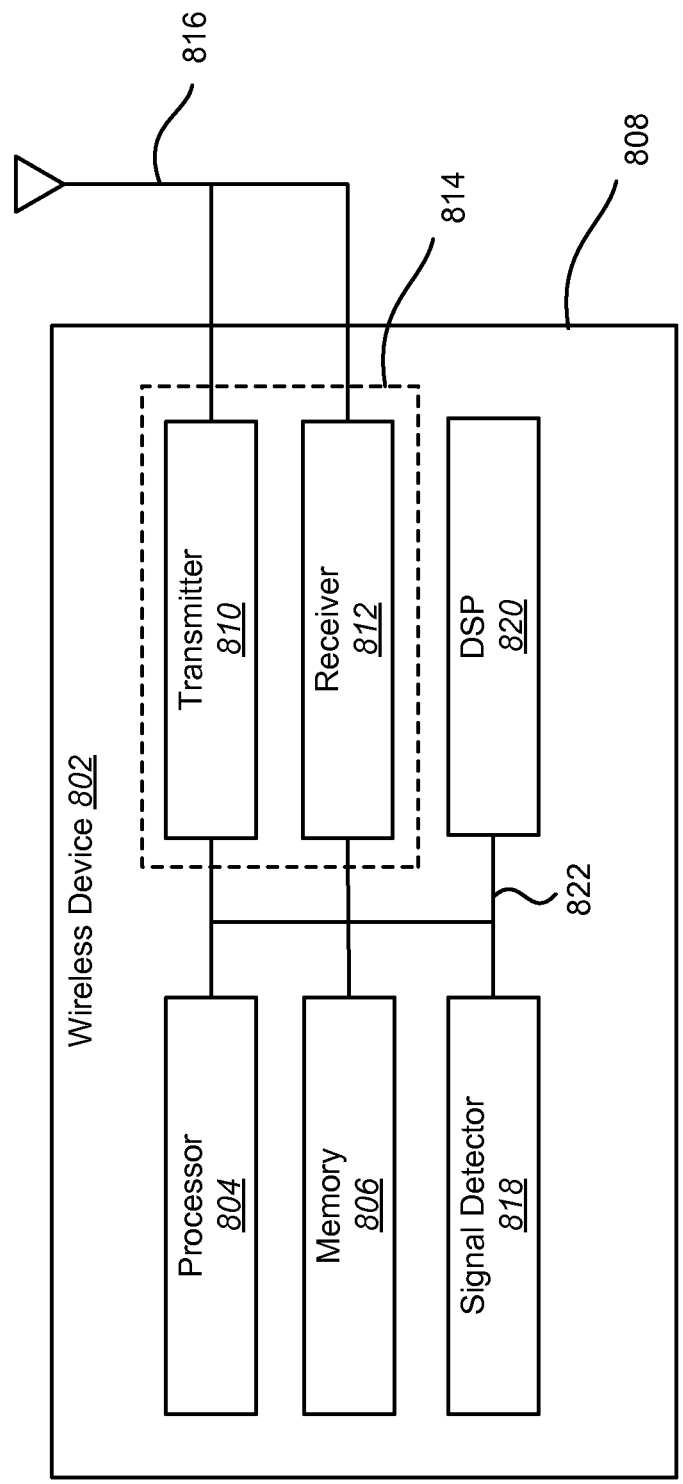
FIG. 8 illustrates various components that may be utilized in a wireless device.

FIG. 8 illustrates various components that may be utilized in a wireless device 802. The wireless device 802 is an example of a device that may be configured to implement the various methods described herein.

The wireless device 802 may include a processor 804 which controls operation of the wireless device 802. The processor 804 may also be referred to as a central processing unit (CPU). Memory 806, which may include both read-only memory (ROM) and random access memory (RAM), provides instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable to implement the methods described herein.

The wireless device 802 may also include a housing 808 that may include a transmitter 810 and a receiver 812 to allow transmission and reception of data between the wireless device 802 and a remote location. The transmitter 810 and receiver 812 may be combined into a transceiver 814. An antenna 816 may be attached to the housing 808 and electrically coupled to the transceiver 814. The wireless device 802 may also include (not shown) multiple transmitters, multiple receivers, multiple transceivers and/or multiple antenna.

The wireless device 802 may also include a signal detector 818 that may be used to detect and quantify the level of signals received by the transceiver 814. The signal detector 818 may detect such signals as total energy, pilot energy per pseudonoise (PN) chips, power spectral density, and other signals. The wireless device 802 may also include a digital signal processor (DSP) 820 for use in processing signals.

The various components of the wireless device 802 may be coupled together by a bus system 822 which may include a power bus, a control signal bus, and a status signal bus in addition to a data bus. However, for the sake of clarity, the various busses are illustrated in FIG. 8 as the bus system 822.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIG. 6, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing interference in a wireless communication system, the method comprising:
    determining information about at least one disallowed beam corresponding to at least one antenna pattern of at least one served user, wherein determining the information about the at least one disallowed beam includes:
        making a measurement of at least one reverse link from the at least one served user to at least one base station, wherein the measurement of the at least one reverse link includes partial channel state information at a transmitter; and
        making forward link measurements from a neighboring sector or a serving sector, wherein the forward link measurements correspond to one or more of a desired serving sector, a desired serving beam, a disallowed beam, downlink or forward channel information, an estimate of forward link information based on the measurement made of the at least one reverse link, and one or more combinations of any of the proceeding;
    making scheduling decisions, based at least in part on the measurement made of the at least one reverse link and the forward link measurements, for served users so as to avoid transmissions via the at least one disallowed beam, wherein the scheduling decisions are coordinated between multiple sectors when the at least one disallowed beam is a desired serving beam for a second user and the scheduling decisions are made to accommodate the at least one served user and the second user; and
    transmitting data to users in accordance with the scheduling decisions.

2. The method of claim 1, wherein determining the information about the at least one disallowed beam comprises receiving the information from the at least one served user.

3. The method of claim 1, wherein transmitting the data in accordance with the scheduling decisions implements single-input and multiple-output (SIMO) transmissions.

4. The method of claim 1, wherein transmitting the data in accordance with the scheduling decisions implements multiple-input and multiple-output (MIMO) transmissions.

5. The method of claim 1, wherein transmitting the data in accordance with the scheduling decisions implements spatial division multiple access (SDMA) transmissions.

6. The method of claim 1, wherein the at least one disallowed beam corresponds to a neighboring sector of the at least one served user.

7. The method of claim 1, wherein the at least one disallowed beam corresponds to a serving sector of the at least one served user.

8. An apparatus for reducing interference in a wireless communication system, the apparatus comprising:
    a processor;
    memory accessible by the processor;
    instructions stored in the memory, the instructions being executable to:
    determine information about at least one disallowed beam corresponding to at least one antenna pattern of at least one served user, wherein the instructions to determine the information about the at least one disallowed beam include instructions executable to make:
        a measurement of at least one reverse link from the at least one served user to at least one base station, wherein the measurement of the at least one reverse link includes partial channel state information at a transmitter; and
        forward link measurements from a neighboring sector or a serving sector, wherein the forward link measurements correspond to one or more of a desired serving sector, a desired serving beam, a disallowed beam, downlink or forward channel information, an estimate of forward link information based on the measurement made of the at least one reverse link, and one or more combinations of any of the proceeding;
    make scheduling decisions, based at least in part on the measurement made of the at least one reverse link and the forward link measurements, for served users so as to avoid transmissions via the at least one disallowed beam, wherein the scheduling decisions are coordinated between multiple sectors when the at least one disallowed beam is a desired serving beam for a second user and the scheduling decisions are made to accommodate the at least one served user and the second user; and
    transmit data to users in accordance with the scheduling decisions.

9. The apparatus of claim 8, wherein determining the information about the at least one disallowed beam comprises receiving the information from the at least one served user.

10. The apparatus of claim 8, wherein transmitting the data in accordance with the scheduling decisions implements single-input and multiple-output (SIMO) transmissions.

11. The apparatus of claim 8, wherein transmitting the data in accordance with the scheduling decisions implements multiple-input and multiple-output (MIMO) transmissions.

12. The apparatus of claim 8, wherein transmitting the data in accordance with the scheduling decisions implements spatial division multiple access (SDMA) transmissions.

13. The apparatus of claim 8, wherein the at least one disallowed beam corresponds to a neighboring sector of the at least one served user.

14. The apparatus of claim 8, wherein the at least one disallowed beam corresponds to a serving sector of the at least one served user.

15. An apparatus for reducing interference in a wireless communication system, the apparatus comprising:
    means for determining information about at least one disallowed beam corresponding to at least one antenna pattern of at least one served user, the means for determining the information about the at least one disallowed beam using a processor or a processing circuit and including means for:
        making a measurement of at least one reverse link from the at least one served user to at least one base station, wherein the measurement of the at least one reverse link includes partial channel state information at a transmitter; and
        making forward link measurements from a neighboring sector or a serving sector, wherein the forward link measurements correspond to one or more of a desired serving sector, a desired serving beam, a disallowed beam, downlink or forward channel information, an estimate of forward link information based on the measurement made of the at least one reverse link, and one or more combinations of any of the proceeding;

means for making scheduling decisions using a processor or a processing circuit, based at least in part on the measurement made of the at least one reverse link and the forward link measurements, for served users so as to avoid transmissions via the at least one disallowed beam, wherein the scheduling decisions are coordinated between multiple sectors when the at least one disallowed beam is a desired serving beam for a second user and the scheduling decisions are made to accommodate the at least one served user and the second user; and means for transmitting data to users in accordance with the scheduling decisions.

16. The apparatus of claim 15, wherein determining the information about the at least one disallowed beam comprises receiving the information from the at least one served user.

17. The apparatus of claim 15, wherein transmitting the data in accordance with the scheduling decisions implements single-input and multiple-output (SIMO) transmissions.

18. The apparatus of claim 15, wherein transmitting the data in accordance with the scheduling decisions implements multiple-input and multiple-output (MIMO) transmissions.

19. The apparatus of claim 15, wherein transmitting the data in accordance with the scheduling decisions implements spatial division multiple access (SDMA) transmissions.

20. The apparatus of claim 15, wherein the at least one disallowed beam corresponds to a neighboring sector of the at least one served user.

21. The apparatus of claim 15, wherein the at least one disallowed beam corresponds to a serving sector of the at least one served user.

22. A non-transitory computer-readable medium comprising instructions for reducing interference in a wireless communication system, which when executed by a processor cause the processor to perform operations comprising:

determining information about at least one disallowed beam corresponding to at least one antenna pattern of at least one served user, including:

making a measurement of at least one reverse link from the at least one served user to at least one base station, wherein the measurement of the at least one reverse link includes partial channel state information at a transmitter; and making forward link measurements from a neighboring sector or a serving sector, wherein the forward link measurements correspond to one or more of a desired serving sector, a desired serving beam, a disallowed beam, downlink or forward channel information, an estimate of forward link information based on the measurement made of the at least one reverse link, and one or more combinations of any of the proceeding;

making scheduling decisions, based at least in part on the measurement made of the at least one reverse link and the forward link measurements, for served users so as to avoid transmissions via the at least one disallowed beam, wherein the scheduling decisions are coordinated between multiple sectors when the at least one disallowed beam is a desired serving beam for a second user and the scheduling decisions are made to accommodate the at least one served user and the second user; and transmitting data to users in accordance with the scheduling decisions.

23. The non-transitory computer-readable medium of claim 22, wherein determining the information about the at least one disallowed beam comprises receiving the information from the at least one served user.

24. The non-transitory computer-readable medium of claim 23, wherein transmitting the data in accordance with the scheduling decisions implements single-input and multiple-output (SIMO) transmissions.

25. The non-transitory computer-readable medium of claim 22, wherein transmitting the data in accordance with the scheduling decisions implements multiple-input and multiple-output (MIMO) transmissions.

26. The non-transitory computer-readable medium of claim 22, wherein transmitting the data in accordance with the scheduling decisions implements spatial division multiple access (SDMA) transmissions.

27. The non-transitory computer-readable medium of claim 22, wherein the at least one disallowed beam corresponds to a neighboring sector of the at least one served user.

28. The non-transitory computer-readable medium of claim 22, wherein the at least one disallowed beam corresponds to a serving sector of the at least one served user.

* * * * *